United States Patent Office 3,069,320
Patented Dec. 18, 1962

3,069,320
SYNERGISTIC SANITIZING PROCESS WITH NEOMYCIN AND SELECTED CATIONIC SURFACE ACTIVE QUATERNARY AMMONIUM SALTS
Emil A. Vitalis, Springdale, Conn., assignor to American Cyanamid Company, New York, N.Y., a corporation of Maine
No Drawing. Filed Nov. 18, 1958, Ser. No. 774,588
5 Claims. (Cl. 167—65)

This invention relates to germicidal compositions of the type used for cleaning and sterilizing milk containers and milk handling machinery and as a general household sterilizing agent wherein the active germicide is neomycin in admixture with a cationic surface active agent.

Neomycin is an antibiotic that is usually produced by the fermentation of Streptomyces fradiae. It is a basic substance which is ordinarily isolated and used in the form of its salts of organic or inorganic acids; it is usually sold and used as neomycin sulfate. In such salts the base portion retains its antibacterial properties when the salt is dissolved in water, and its aqueous solutions can therefore be used as industrial germicides. Neomycin and its properties are fully described in the book entitled "Neomycin," by S. A. Waksman.

I have found that the effectiveness of germicidal compositions which contain neomycin as the principal active germicidal agent is greatly increased by incorporating a cationic surface active agent therein. The bactericidal or germ-killing power of the resulting mixture is many times that of either of the two ingredients when used without the other, and therefore a true potentiation or synergistic action has been found to exist. Aqueous germicidal solutions containing neomycin together with a cationic surface active agent, such as those hereinafter described, are therefore highly effective disinfectants and sterilizing agents.

The cationic surface active agents used in practicing the invention are water-soluble compounds which contain a hydrophobic or lyophilic radical so combined with basic nitrogen that the group forms a cation when the compound is dissolved in water. They can therefore be represented generally by the formula

(1)

in which X is an anion such as chloride, phosphate, nitrate, citrate, salicylate and the like and R is the hydrophobic group, usually one which contains an aliphatic radical of 7 or more carbon atoms or an alkaryl radical of comparable chain length. The remaining radicals $R^1$, $R^2$ and $R^3$ may be short-chain aliphatic radicals such as alkyl or hydroxyalkyl radicals of 1 to 3 carbon atoms or they may be combined as part of a cyclic base as in the pyridinium salts. Any one or more of $R^1$, $R^2$ and $R^3$ may be a benzyl or other similar alkaryl radical or may be a hydrogen atom as in the primary, secondary or tertiary amine salts.

The major classes of cationic surface active agents are described in Chapter 7 of "Surface Active Agents," by Schwartz and Perry (1949), along with their methods of preparation. Typical compounds that are obtainable commercially and are therefore of greatest importance in preparing the compositions of the present invention are the quaternary alkylpyridinium and acylamidoalkylpyridinium salts of the type of "Zelan" and the quaternized tertiary amines of Formula 1 in which $R^1$, $R^2$ and $R^3$ are short-chain aliphatic radicals of 1–3 carbon atoms, one or more of which may contain hydroxy, benzyl or other substituents. These commercial products differ among themselves principally in the character and size of the long-chain hydrophobic radical R, which is usually an alkyl radical of about 8 to 18 carbon atoms as in the cetyltrimethylammonium salts and the alkyldimethylbenzylammonium chloride sold as "Zephiran," an acylamidoalkylene radical as in the Sapamines and the cationic Aerosols described in U.S. Patents Nos. 2,459,062 and 2,589,674, an alkylphenol ether as in the Hyamines, or an ester, ether ester, or ester amide linkage as in the Emulsepts.

The germicidal compositions of the invention are prepared by mixing neomycin with one or more water-soluble surface active agents of the above or related classes. Preferably the composition contains from about 0.1 part to about 10–25 parts or more of the surface active agent for each part by weight of neomycin, the exact ratio depending on the particular surface active agent. Thus the acylamidoalkyl compounds of the formula

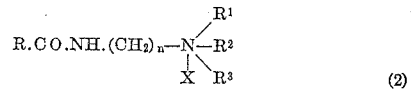
(2)

in which R is an aliphatic hydrocarbon radical of from 8 to 18 carbon atoms, n is a whole number from 1 to 3, inclusive, $R^1$ and $R^2$ are alkyl or hydroxyalkyl radicals of from 1 to 3 carbon atoms, $R^3$ is the same as $R^1$ or is a benzyl radical and X is an anion such as the chloride, bromide, iodide, nitrate, sulfate, phosphate or other acid radical forming a water-soluble salt constitute a preferred class of cationic surface active agents by reason of their cheapness and commercial availability and are preferably used in quantities of from 1 to 10 times the weight of the neomycin. Typical compounds of this class are the following:

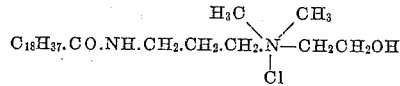

Stearamidopropyl - dimethylhydroxyethylammonium chloride

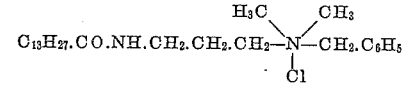

Lauramidopropyl - dimethylbenzylammonium chloride and the corresponding phosphates, nitrates and other water-soluble salts.

The compositions may be prepared and sold as dry mixtures of the two essential ingredients; i.e., a neomycin salt and the cationic agent, to be dissolved in water to any desired concentration by the ultimate user. A dry mixture of one part by weight of neomycin sulfate with 8 parts of Emulsept is a typical example. Such mixtures may contain extenders or blending agents such as sodium sulfate, sodium benzoate, sodium chloride, sugars and the like. Extended mixtures of this type are conveniently prepared by dissolving their ingredients in water and spray drying the mixture.

For most purposes, however, and particularly for use as an industrial sanitizing agent, a water solution of the composition is preferred. Such a composition preferably consists of from 1% to 50% by weight of neomycin sulfate and 50% to 1% of the cationic surface active agent, the balance being sufficient water to dissolve the mixture. It presents the important advantage that it will kill bacteria that are either resistant to ordinary cationic surface active bactericides or which develop an immunity thereto. It is therefore recommended for use in sterilizing dairy equipment, meat cutting and packing equipment and other food packing and canning machinery as well as in detergent compositions having antiseptic properties for use in hospitals and schools and other public buildings.

The invention will be furthed described and illustrated by the following specific examples to which, however, it is not limited.

*Examples*

Samples having the following compositions were prepared, the quantities being expressed as percent by weight. In each neomycin-containing sample the theoretical potency was calculated to be 120 micrograms per milliliter.

| Sample No. | 1 | 2 | 3 | 4 | 5 | 6 | 7 | 8 |
|---|---|---|---|---|---|---|---|---|
| Neomycin sulfate, 40% | | 5 | | 5 | 5 | | | 4.75 |
| Emulsept | | | | | 15 | 15 | | |
| Aerosol SE, 35% | | | 40 | 40 | | | | |
| Zelan | | | | | | | 10 | 9.5 |
| Hyamine 1622, 35% | 40 | 40 | | | | | | |
| Ethanol | | | | | | | 5 | 4.75 |
| Water | 60 | 55 | 60 | 55 | 80 | 85 | 85 | 81 |

The compounds tested are described on pages 175, 178 and 188 of Schwartz-Perry, "Surface Active Agents," and in the U.S. patents indicated.

| Trade Name | Formula |
|---|---|
| Emulsept [1] | $R^*.CO.OC_2H_4.NH.CO.CH_2.\overset{Cl}{\underset{Cl}{N}}(CH_3)_3$ |
| Aerosol SE [2] | $C_{17}H_{35}.CO.NH.CH_2.CH_2.CH_2.\overset{(CH_3)_2}{\underset{Cl}{N}}-CH_2CH_2OH$ |
| Zelan | $C_{17}H_{35}.CO.NH.CH_2.\underset{Cl}{N}\langle\text{pyridine}\rangle$ |
| Hyamine 1622 [3] | $C_8H_{17}.C_6H_4O.(CH_2CH_2O)_2.CH_2CH_2.\overset{(CH_3)_2}{\underset{Cl}{N}}-CH_2.C_6H_5$ |

*R is the residue of coconut fatty acids.
[1] See U.S. Patents Nos. 2,245,593 and 2,189,664.
[2] See U.S. Patent No. 2,589,674.
[3] See U.S. Patents Nos. 2,170,111 and 2,229,024.

The samples were tested for germicidal activity against *B. subtilis* using the plate assay method described by Anthony Abbey in "Antibiotics and Chemotherapy," vol. 2, pages 528–531, with the following results:

| Sample No. | Activity Increase Over Neomycin Alone |
|---|---|
| 1 | Slight activity. |
| 2 | 41 fold. |
| 3 | No activity. |
| 4 | 186 fold. |
| 5 | 183 fold. |
| 6 | No activity. |
| 7 | No activity. |
| 8 | 103 fold. |

The admixture of cationic surface active agents with neomycin increased its bactericidal power by factors of from 41 to 186 although the control samples showed little or no activity.

What I claim is:

1. A method for controlling *B. subtilis* and other bacteria which are resistant or immune to ordinary cationic surface active bactericides in aqueous systems which comprises contacting said bacteria with a composition consisting essentially of water, neomycin and a compound of the formula

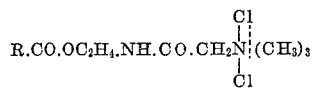

wherein R is the residue of a coconut fatty acid.

2. A method for controlling *B. subtilis* and other bacteria which are resistant or immune to ordinary cationic surface active bactericides in aqueous systems which comprises contacting said bacteria with a composition consisting essentially of water, neomycin and a compound of the formula

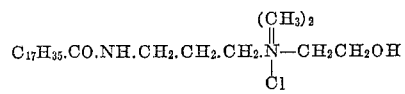

3. A method for controlling *B. subtilis* and other bacteria which are resistant or immune to ordinary cationic surface active bactericides in aqueous systems which comprises contacting said bacteria with a composition consisting essentially of water, neomycin and a compound of the formula

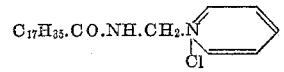

4. A method for controlling *B. subtilis* and other bacteria which are resistant or immune to ordinary cationic surface active bactericides in aqueous systems which comprises contacting said bacteria with a composition consisting essentially of water, neomycin and a compound of the formula

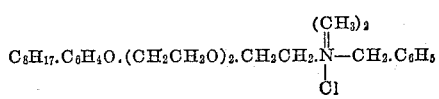

5. A method for controlling *B. subtilis* and other bacteria which are resistant or immune to ordinary cationic surface active bactericides in aqueous systems which comprises contacting said bacteria with a composition consisting essentially of water, neomycin and a member selected from the group consisting of a water-soluble salt of acylamidopyridinium and acylamidoalkyl of the formula

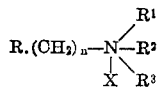

in which R is selected from the group consisting of alkylamido in which the alkyl radical has from 8 to 18 carbon atoms, alkylphenol ether radical of the formula

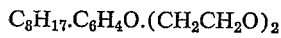

and an ester amide radical of the formula

wherein R* is the residue of a coconut fatty acid, $n$ is a whole number selected from 1, 2 and 3, $R^1$ and $R^2$ each represents a member selected from the group consisting of alkyl having 1 to 3 carbon atoms and hydroxy-substituted alkyl having from 1 to 3 carbon atoms, $R^3$ represents a member selected from the group consisting of alkyl having from 1 to 3 carbon atoms, hydroxy-substituted alkyl having from 1 to 3 carbon atoms and benzyl, and $R^1$, $R^2$ and $R^3$ when combined with N represent pyridinium, and X is an anion selected from the group consisting of chloride, bromide, nitrate, sulfate and phosphate.

References Cited in the file of this patent

UNITED STATES PATENTS

| | | |
|---|---|---|
| 2,702,780 | Lerner | Feb. 22, 1955 |
| 2,730,483 | Mast et al. | Jan. 10, 1956 |
| 2,801,201 | Kipnis | July 30, 1957 |
| 2,822,314 | Ferlauto et al. | Feb. 4, 1958 |
| 2,830,011 | Parker et al. | Apr. 8, 1958 |
| 2,926,119 | Niederhauser | Feb. 23, 1960 |
| 2,951,766 | White | Spet. 6, 1960 |
| 2,951,787 | Lo Cicero et al. | Spet. 6, 1960 |
| 2,951,788 | Chien-Pen Lo et al. | Sept. 6, 1960 |
| 3,008,875 | Dale | Nov. 14, 1961 |

OTHER REFERENCES

Dale, JAPA, Prac. Pharm. Ed., July 1957, pp. 421–425.

"Water Bugs in the Bassinet" (editorial), A.M.A. American Journal of Diseases of Children, vol. 101, No. 3, pp. 273–277, March 1961.

Dale et al., "Effectiveness of Preservatives in Commercial Opthalmic Preparations," J. Am. Pharm. Assoc., Prac. Phy. Ed., vol. 20, No. 1, pp. 32–35, January 1959.

Plotkin et al., "Bacteremia Caused by Pseudomonas Sp. Following the Use of Materials Stored in Solutions of a Cationic Surface-Active Agent," Am. J. M. Sc., vol. 235, No. 6, pp. 621–627, June 1958.